(12) United States Patent
Watanabe et al.

(10) Patent No.: US 10,047,795 B2
(45) Date of Patent: Aug. 14, 2018

(54) CAGE AND ROLLERS

(71) Applicant: NSK LTD., Tokyo (JP)

(72) Inventors: Eisho Watanabe, Takasaki (JP); Sou Matsumoto, Takasaki (JP); Kouji Ishikawa, Takasaki (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/104,742

(22) PCT Filed: Dec. 9, 2014

(86) PCT No.: PCT/JP2014/082577
§ 371 (c)(1),
(2) Date: Jun. 15, 2016

(87) PCT Pub. No.: WO2015/093348
PCT Pub. Date: Jun. 25, 2015

(65) Prior Publication Data
US 2016/0319869 A1 Nov. 3, 2016

(30) Foreign Application Priority Data

Dec. 16, 2013 (JP) .................................. 2013-258989
Jan. 24, 2014 (JP) .................................. 2014-011789

(51) Int. Cl.
*F16C 33/46* (2006.01)
*F16C 19/46* (2006.01)
(Continued)

(52) U.S. Cl.
CPC ............ *F16C 33/4694* (2013.01); *F01L 1/18* (2013.01); *F01L 1/181* (2013.01); *F01L 1/46* (2013.01);
(Continued)

(58) Field of Classification Search
CPC .............. F16C 33/4605; F16C 33/4635; F16C 33/4694
See application file for complete search history.

(56) References Cited

U.S. PATENT DOCUMENTS 2,644,730 A * 7/1953 Levine ................ F16C 33/4694
384/577
4,153,309 A * 5/1979 Markfelder et al. .... F16C 19/46
384/560
(Continued)

FOREIGN PATENT DOCUMENTS

CN       101918725 A     12/2010
CN       202971584 U      6/2013
(Continued)

OTHER PUBLICATIONS

Machine Translation of JP 2005-172059.*
(Continued)

*Primary Examiner* — Thomas R Hannon
(74) *Attorney, Agent, or Firm* — Sughrue Mion, PLLC

(57) ABSTRACT

A cage of a cage and rollers includes engaging projecting portions that are provided on outer circumferential surfaces of rim portions, the engaging projecting portions being configured to be elastically deformed when the cage is inserted into a support hole of a rocker arm to thereby allow the cage to be contracted in diameter and to be elastically restored to be brought into engagement with the rocker arm after the cage is inserted in the support hole, to thereby position the cage properly in relation to an axial direction relative to the rocker arm. The cage and rollers can be assembled to the rocker arm while being positioned properly in relation to the axial direction so that the cage and rollers and the rocker arm can be formed into a rocker arm unit, and the cage and rollers can easily be assembled to the rocker arm.

5 Claims, 17 Drawing Sheets

(51) Int. Cl.
  *F16C 33/51* (2006.01)
  *F16C 43/06* (2006.01)
  *F16C 33/50* (2006.01)
  *F01L 1/18* (2006.01)
  *F16H 53/06* (2006.01)
  *F01L 1/46* (2006.01)

(52) U.S. Cl.
  CPC ........ *F16C 19/466* (2013.01); *F16C 33/4605* (2013.01); *F16C 33/4635* (2013.01); *F16C 33/504* (2013.01); *F16C 33/516* (2013.01); *F16C 43/06* (2013.01); *F16H 53/06* (2013.01); *F01L 2103/00* (2013.01); *F01L 2105/00* (2013.01); *F16C 2360/18* (2013.01)

(56) References Cited

U.S. PATENT DOCUMENTS

| | | | |
|---|---|---|---|
| 4,797,015 | A | 1/1989 | Hidano et al. |
| 5,044,788 | A * | 9/1991 | Murphy ............... F16C 19/46 384/560 |
| 5,897,215 | A * | 4/1999 | Mirring ............... F16C 19/26 384/564 |
| 2007/0269156 | A1* | 11/2007 | Sakaki ............... F16C 19/46 384/564 |
| 2009/0028482 | A1 | 1/2009 | Iwata et al. |
| 2010/0129023 | A1 | 5/2010 | Lemaitre et al. |
| 2013/0243358 | A1 | 9/2013 | Stork et al. |
| 2014/0341494 | A1 | 11/2014 | Schuler et al. |

FOREIGN PATENT DOCUMENTS

| | | |
|---|---|---|
| DE | 959699 C | 3/1957 |
| DE | 1931030 U | 1/1966 |
| DE | 1249020 B | 8/1967 |
| DE | 19745410 A1 | 4/1999 |
| DE | 102011114837 A1 | 5/2012 |
| DE | 102011082809 A1 | 3/2013 |
| DE | 102011121597 A1 | 6/2013 |
| EP | 2019217 A2 | 1/2009 |
| JP | 61-266827 A | 11/1986 |
| JP | 63-139323 U | 9/1988 |
| JP | 7-293569 A | 11/1995 |
| JP | 9-291941 A | 11/1997 |
| JP | 10-318264 A | 12/1998 |
| JP | 2005-172059 A | 6/2005 |
| JP | 2006-057707 A | 3/2006 |
| JP | 2008-121817 A | 5/2008 |
| JP | 2009-058040 A | 3/2009 |
| JP | 2010-014180 A | 1/2010 |
| JP | 2010-540839 A | 12/2010 |
| JP | 2012-163057 A | 8/2012 |
| JP | 2013-174283 A | 9/2013 |
| WO | 2009/045983 A1 | 4/2009 |
| WO | 2012014069 A1 | 2/2012 |

OTHER PUBLICATIONS

Machine Translation of DE 19745410.*
Search Report dated Feb. 17, 2015, issued by the International Searching Authority in counterpart International Application No. PCT/JP2014/082577 (PCT/ISA/210).
Written Opinion dated Feb. 17, 2015, issued by the International Searching Authority in counterpart International Application No. PCT/JP2014/082577 (PCT/ISA/237).
Extended European Search Report dated Feb. 23, 2017, by the European Patent Office in counterpart European Application No. 14871782.0.
Communication dated May 16, 2017, issued by the State Intellectual Property Office of the People's Republic of China in counterpart Chinese Patent Application No. 201480068778.4.
Communication dated Mar. 13, 2018, issued by the Japanese Patent Office in counterpart Japanese Patent Application No. 2013-258989.

* cited by examiner

CAGE AND ROLLERS

TECHNICAL FIELD

The present invention relates to a cage and rollers and more particularly to a cage and rollers that are mounted, for example, at a rotational support portion of an engine rocker arm.

BACKGROUND ART

Conventionally, to deal with the improvement in fuel economy and reduction in size of a rocker arm, there is disclosed a rocker arm construction in which a needle bearing is used at a support portion of an engine rocker arm to reduce working torque and an outside diameter of a cam follower is designed to be equal to or smaller than an outside diameter of the needle bearing (for example, refer to Patent document 1.).

RELATED ART REFERENCE

Patent Document

Patent Document 1: JP-A-2012-163057

SUMMARY OF THE INVENTION

Problems to be Solved by the Invention

According to the rocker arm construction of Patent Document 1, however, the needle bearing that supports the rocker arm rotatably is made up of drawn cup, a cage and needles. Consequently, since a radial thickness of the needle bearing is determined by a thickness of the drawn cup and a diameter of the needles, the reduction in radial thickness of the needle bearing and hence in size of the rocker arm is limited. Rocker arm manufactures delivery rocker arm units in which a rocker arm and a needle bearing are assembled together in advance to engine manufacturers. However, in the rocker arm units, the rocker arm and the needle bearing are not positioned properly in relation to the axial direction, and therefore, there is still room for improvement in assembling properties.

The invention has been made in view of the problem described above, and an object thereof is to provide a cage and rollers that can be assembled to a rocker arm while being positioned properly in relation to an axial direction to build up a rocker arm unit and which can easily be assembled to the rocker arm.

Means for Solving the Problems

The object of the invention is achieved by the following configurations.

(1) A cage and rollers including:
a plurality of needles that are rolling elements; and
a resin cage including a pair of annular rim portion that are provided so as to be spaced apart in an axial direction from each other and a plurality of pillar portions that are disposed at intervals in a circumferential direction between the rim portions, the pillar portions that lie adjacent to one another in the circumferential direction and the rim portions defining a plurality of pockets in which the plurality of needles are held to roll freely, and configured to be installed in an outer ring corresponding member having a support hole whose inner circumferential surface constitutes a raceway surface for the needles, the cage and rollers, wherein
an engaging projecting portion is provided on an outer circumferential surface of at least one of the rim portions of the cage, the engaging projecting portion being configured to be elastically deformed so as to contract the cage in diameter when the cage is inserted into a support hole of the outer ring corresponding member and to be elastically restored after the cage is inserted in the support hole to be brought into engagement with the outer ring corresponding member to thereby position the cage properly in the axial direction relative to the outer ring corresponding member.

(2) The cage and rollers according to (1), wherein a collar portion is provided on an outer circumferential surface of the other rim portion of the cage, the collar portion being configured to be brought into abutment with a side surface of the outer ring corresponding member.

(3) The cage and rollers according to (1), wherein the engaging projecting portion is formed over a full circumference or at a circumferential portion of the outer circumferential surface of the rim portion.

(4) A cage and rollers including:
a plurality of needles that are rolling elements; and
a resin cage including a pair of annular rim portion that are provided so as to be spaced apart in an axial direction from each other and a plurality of pillar portions that are disposed at intervals in a circumferential direction between the rim portions, the pillar portions that lie adjacent to one another in the circumferential direction and the rim portions defining a plurality of pockets in which the plurality of needles are held to roll freely, and configured to be installed in an outer ring corresponding member having a support hole whose inner circumferential surface constitutes a raceway surface for the needles, the cage and rollers, wherein:
the cage is made up of a pair of substantially semi-cylindrical cage elements having the same shapes;
the pair of cage elements each include a first rim portion having a pair of engaging projecting portions that project in the circumferential direction from circumferential end faces thereof, a second rim portion having on circumferential end faces thereof a pair of engaged portions that can be brought into engagement with the engaging projecting portions and a collar portion that can be brought into abutment with or face a side surface of the outer ring corresponding member, and a plurality of pillar portion that are disposed at intervals in the circumferential direction between the first and second rim portions;
the cage is formed into a cylindrical shape by bringing the engaging projecting portions into engagement with the engaged portions and making up a pair of rim portions by the one or first rim portion of the pair of cage elements and the other or second rim portion of the pair of cage elements, and the other or first rim portion of the pair of cage elements and the one or second rim portion of the pair of cage elements; and
the collar portions of the pair of cage elements are brought into abutment with or face both the side surfaces of the outer ring corresponding member.

(5) The cage and rollers according to claim 4, wherein:
the engaged portions are made up of axial side surfaces of step portions that are formed by spacing the collar portions in the circumferential direction from the circumferential end faces; and
the axial side surface of the first rim portion and the axial side surface of the second rim portion become level with each other.

(6) A cage and rollers including:

a plurality of needles that are rolling elements; and a resin cage including a pair of annular rim portion that are provided so as to be spaced apart in an axial direction from each other and a plurality of pillar portions that are disposed at intervals in a circumferential direction between the rim portions, the pillar portions that lie adjacent to one another in the circumferential direction and the rim portions defining a plurality of pockets in which the plurality of needles are held to roll freely, and configured to be installed in an outer ring corresponding member having a support hole whose inner circumferential surface constitutes a raceway surface for the needles, the cage and rollers, wherein:

a slit is formed in the cage which divides the cage in the circumferential direction so that the cage can be contracted in diameter; and the cage includes engaging projecting portions that are formed on outer circumferential surfaces of the rim portions so as to project radially outwards therefrom to be brought into engagement with the outer ring corresponding member, to thereby position the cage properly in relation to the axial direction relative to the outer ring corresponding member.

(7) The cage and rollers according to (6), wherein circumferential end portions of the cage that define the slit are tapered so as to be inclined relative to a straight line that passes through a center of the cage to extend diametrically.

(8) The cage and rollers according to (6), wherein a radially outer surface of the engaging projecting portion is formed so that an edge portion facing the slit is positioned further radially outwards than an edge portion on a side lying opposite to the side facing the slit as seen in the circumferential direction.

(9) The cage and rollers according to (6), wherein circumferential end portions of the cage that define the slit are formed so as to overlap each other when seen from the axial direction.

(10) The cage and rollers according to any one of (1) to 9( ), wherein the cage and rollers is installed in a rotational support portion of an engine rocker arm that is the outer ring corresponding member.

Advantage of the Invention

According to the cage and rollers of one aspect of the invention, the engaging projecting portion is provided on the outer circumferential surface of at least one of the rim portions of the cage, and the engaging projecting portion is configured to be elastically deformed so as to contract the cage in diameter when the cage is inserted into the support hole of the outer ring corresponding member and to be elastically restored after the cage is inserted in the support hole to be brought into engagement with the outer ring corresponding member to thereby position the cage properly in the axial direction relative to the outer ring corresponding member. Therefore, the cage can be easily installed in the support hole of the outer ring corresponding member from the axial direction in such a state that the cage is pressed radially inwards to be contracted in diameter. In addition, the cage so installed can be positioned properly in relation to the axial direction relative to the outer ring corresponding member as a result of the engaging projecting portion being brought into engagement with the outer ring corresponding member.

In addition, according to the cage and rollers of another aspect of the invention, the cage is made up of the pair of substantially semi-cylindrical cage elements having the same shapes. The pair of cage elements each include the first rim portion having the pair of engaging projecting portions that project in the circumferential direction from the circumferential direction end faces thereof, the second rim portion having on the circumferential direction end faces thereof the pair of engaged portions that can be brought into engagement with the engaging projecting portions and the collar portion that can be brought into abutment with or face the side surface of the outer ring corresponding member, and the plurality of pillar portion that are disposed at intervals in the circumferential direction between the first and second rim portions. The cage is formed into the cylindrical shape by bringing the engaging projecting portions into engagement with the engaged portions and making up the pair of rim portions by the one or first rim portion of the pair of cage elements and the other or second rim portion of the pair of cage elements, and the other or first rim portion of the pair of cage elements and the one or second rim portion of the pair of cage elements. The collar portions of the pair of cage elements are brought into abutment with or face both the side surfaces of the outer ring corresponding member. In this case, too, the cage can be easily installed in the support hole of the outer ring corresponding member from the axial direction. In addition, the cage so installed can be positioned properly in relation to the axial direction by the collar portions of the pair of cage elements being brought into abutment with or facing the side surfaces of the outer ring corresponding member. Further, by assembling together the cage elements having the same shapes from the left and right opposite directions, it is possible to configure the cage with a good weight balance.

According to the cage and rollers of a further another aspect of the invention, the slit is formed in the cage which divides the cage in the circumferential direction so that the cage can be contracted in diameter. The cage includes the engaging projecting portions that are formed on the outer circumferential surfaces of the rim portions so as to project radially outwards therefrom to be brought into engagement with the outer ring corresponding member, to thereby position the cage properly in relation to the axial direction relative to the outer ring corresponding member. Thus, the cage can easily be installed in the support hole of the outer ring corresponding member from the axial direction in such a state that the cage is pressed radially inwards to be contracted in diameter. In addition, the cage so installed is positioned properly in relation to the axial direction by the engaging projecting portions being brought into engagement with the outer ring corresponding member.

MODES FOR CARRYING OUT THE INVENTION

Hereinafter, embodiments of a cage and rollers according to the invention will be described in detail based on the drawings.

First Embodiment

Firstly, referring to FIG. 1, a cam follower device 1 will be described in which a cage and rollers 30 according to the invention is installed in a support hole (a rotational support portion) 4a of a rocker arm 4.

Figure 1:
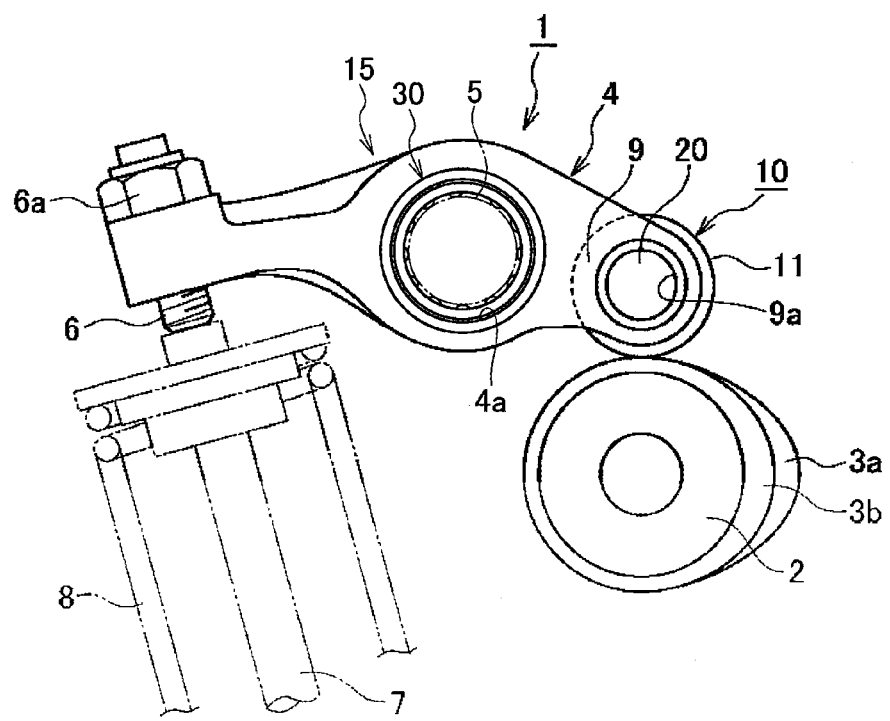
FIG. 1 is a side view of a cam follower into which a cage and rollers according to the invention is incorporated.

In the cam follower device 1, a high-speed cam 3a and a low-speed cam 3b are supported on a cam shaft 2 that rotates in synchronism with a crankshaft of an engine, not shown, so as to slide in an axial direction (a front-to-back direction of a sheet of paper on which FIG. 1 is drawn). A rocker arm 4 is disposed in a position that faces the high-speed cam 3a or the low-speed cam 3b that slides in the axial direction so as to bear the movement of the cams 3a, 3b. This rocker arm 4 has the support hole 4a in which the cage and rollers 30 is installed at a middle portion in a longitudinal direction (a left-to-right direction in FIG. 1) thereof, and the rocker arm 4 is supported pivotally on a cylinder head, not shown, via a rocker shaft 5 that is inserted into the cage and rollers 30.

In addition, an adjusting bolt 6 is screwed through a proximal end portion (a left end portion in FIG. 1) of the rocker arm 4, and this adjusting bolt 6 is fastened to be fixed in place by a locknut 6a. An end portion (an upper end portion in FIG. 1) of an engine valve 7, functioning as an intake valve or an exhaust valve, is brought into abutment with an end portion (a lower end portion in FIG. 1) of the adjusting bolt 6. This engine valve 7 is supported on the cylinder head, not shown, so as to reciprocate. The engine valve 7 is biased in a closing direction (a direction in which the engine valve 7 is brought into abutment with the adjusting bolt 6) at all times by a valve spring 8. Thus, the rocker arm 4 is biased in a clockwise direction in FIG. 1 at all times.

On the other hand, a pair of support wall portions 9 are provided at a distal end portion (a right end portion in FIG. 1) of the rocker arm 4 so as to be spaced apart from each other. Tappet roller bearings 10 are mounted on the pair of support wall portions 9.

The tappet roller bearings 10 are disposed individually between the pair of support wall portions 9 and hold a tappet roller 11 with an outer circumferential surface of which outer circumferential surfaces of the high-speed cam 3a and the low-speed cam 3b are brought into abutment and a support shaft 20 that is supported in shaft holes 9a in the pair of support wall portions 9 at both end portions thereof to support the tappet roller 11 rotatably. The support shaft 20 is formed of a solid or hollow steel shaft member and is fixed in place in the shaft holes 9a by the end portions being crimped into the shaft holes 9a formed to pair of support wall portions 9.

The rocker arm 4 is made into a rocker arm unit 15 with the case and rollers 30 inserted in the support hole 4a, and the resulting rocker arm unit 15 is then incorporated in the cam follower device 1.

In the cam follower device 1 that is configured in the way described above, the tappet roller 11 is brought into abutment with the outer circumferential surface of the high-speed cam 3a or the low-speed cam 3b by means of the biasing force of the valve spring 8. In this state, a rotation of the cam shaft 2 is converted into a reciprocating oscillating motion of the rocker arm 4 about the rocker shaft 5, and the engine valve 7 is moved to reciprocate in the axial direction against the biasing force of the valve spring 8 or by means of the biasing force of the valve spring 8 with the lift amount of the engine valve 7 made variable. This reciprocating motion of the engine valve 7 opens or closes an intake port or an exhaust port that is provided in the cylinder head, not shown.

Figure 15:
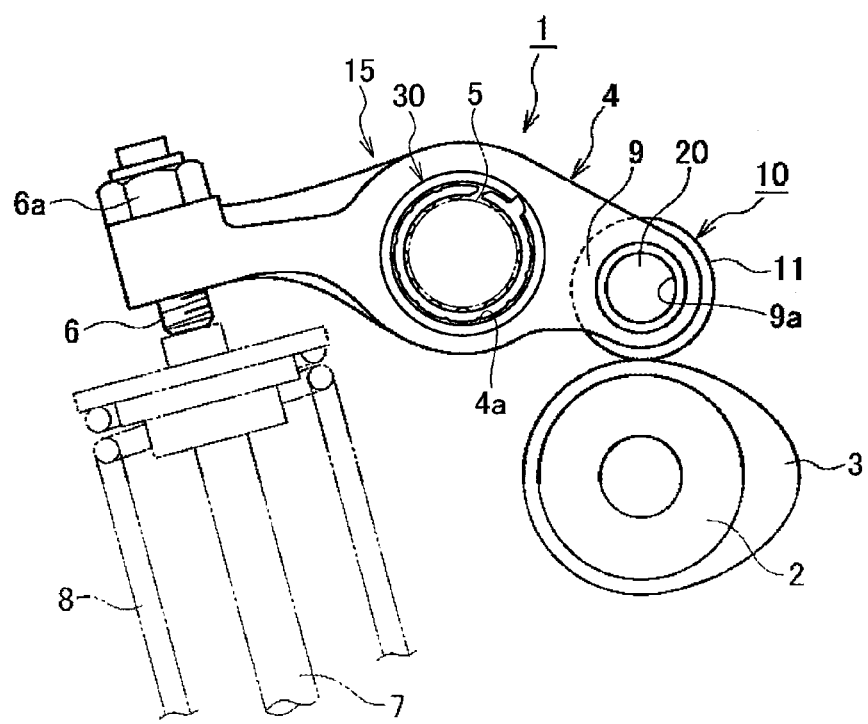
FIG. 15 is a side view of a cam follower in which a cage and rollers according to a sixth embodiment of the invention is incorporated.

In the cam follower device 1, as shown in FIG. 15, which will be described later, a single cam 3 may be used in place of the high-speed cam 3a or the low speed cam 3b that slides in the axial direction.

Figure 2:
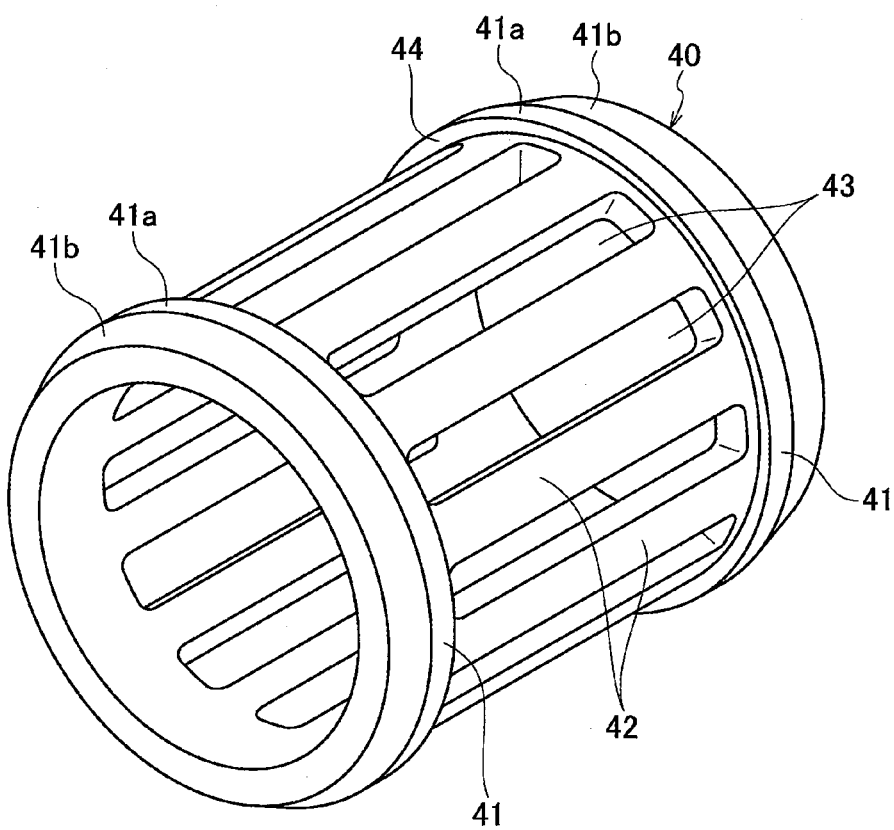
FIG. 2 is a perspective view of a cage that makes up a cage and rollers according to a first embodiment of the invention.
Figure 3:
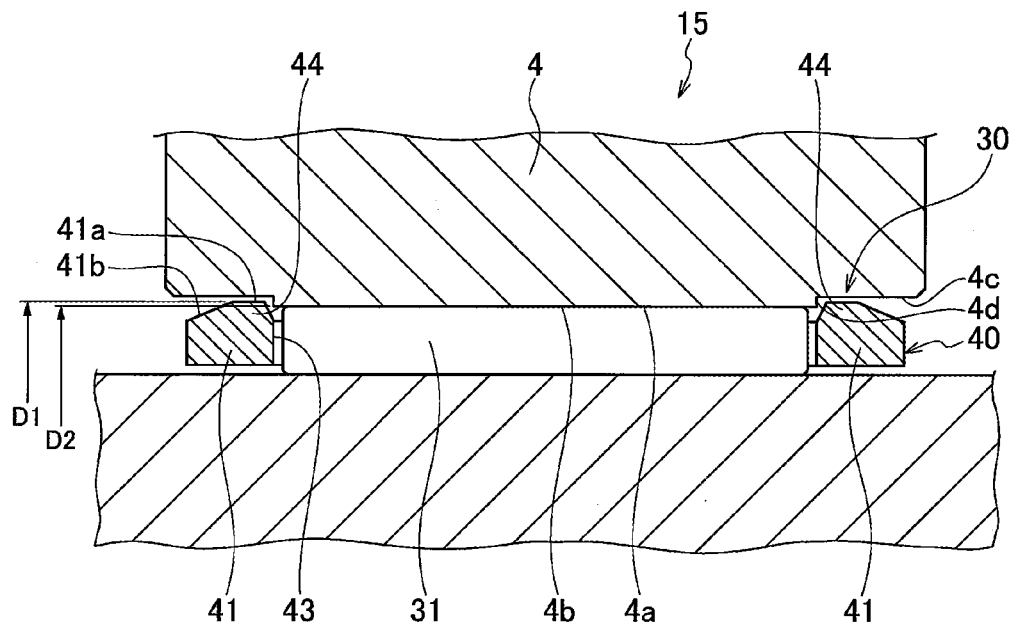
FIG. 3 is a main part sectional view showing a state in which the cage and rollers shown in FIG. 2 is incorporated in an outer ring corresponding member.

Next, the cage and rollers 30 that is installed in the support hole 4a of the rocker arm 4 will be described. As shown in FIGS. 2 and 3, the cage and rollers 30 of this embodiment includes a plurality of needles 31, which are rolling elements, and a resin cage 40 that holds the plurality of needles 31 so as to roll freely.

The cage 40 includes a pair of annular rim portions 41 that are provided so as to be spaced apart in the axial direction from each other and a plurality of pillar portions 42 that are disposed at intervals in a circumferential direction between both the rim portions 41. Then, a plurality of pockets 43 are formed by being defined by the pillar portions 42 that lie adjacent to one another in the circumferential direction and both the rim portions 41. The plurality of needles 31 are held individually in the plurality of pockets 43 so as to roll freely therein.

Engaging projecting portions 44 are provided individually on outer circumferential surfaces 41a of both the rim portions 41, and the engaging projecting portions 44 each have a diameter D1 that is set slightly greater than a diameter D2 of a raceway surface 4b of the support hole 4a. Circular conical inclined surfaces 41b are formed individually at axial end portions of the outer circumferential surfaces 41a of both the rim portions 41, and these circular conical inclined surfaces 41b are formed so as to be gradually reduced in diameter as they extend axially outwards.

As shown in FIGS. 1 and 3, the cage and rollers 30 that is configured in the way described above is installed in the support hole 4a of the engine rocker arm 4 to make up the resulting rocker arm unit 15, which is then assembled to the cam follower device 1.

The cage and rollers 30 is assembled to the rocker arm 4 by forcing the cage 40 axially into the support hole 4a of the rocker arm 4 from an inclined surface 41b side. This elastically deforms the rim portion 41 along the circular conical inclined surface 41b, whereby the cage 40 is inserted into the support hole 4a of the rocker arm 4 while the rim portion 41 is being contracted in diameter.

When the cage 40 is inserted to a predetermined position, the rim portion 41 that is contracted in diameter is elastically restored to the original state, and the engaging projecting portions 44 of both the rim portions 41 that are greater in diameter than the diameter D2 of the raceway surface 4b are brought into engagement with corresponding step portions 4d that are formed between large-diameter portions 4c formed at end portions of the rocker arm 4 and the raceway surface 4b. This positions the cage and rollers 30 properly in the axial direction relative to the rocker arm 4 and restrains the cage and rollers 30 and the rocker arm 4 from being detached. Consequently, even when the cage 40 rotates relative to the rocker arm 4, the needles 31 can be prevented from being dislocated from the raceway surface 4b.

In general, since the rocker arm 4 is carburized, an inner circumferential surface of the support hole 4a can be used as the outer ring raceway 4b, and the cage and rollers 30 that includes no outer ring can be used. Consequently, a radial thickness of the cage and rollers 30 is determined by a diameter of the needles 31, and therefore, a radial thickness of a bearing portion is reduced, and hence, the rocker arm unit 15 can be reduced in size.

The cage and rollers 30 and the rocker arm 4 can be assembled into the rocker arm unit 15, so that the cage and rollers 30 and the rocker arm 4 can be delivered from the rocker arm manufacturer to an engine manufacturer in the form of the rocker arm unit 15, whereby not only can the cage and rollers 30 and the rocker arm 4 be handled easily but also the cage and rollers 30 and the rocker arm 4 can easily be assembled to an engine as the rocker arm unit 15, this improving the assembling efficiency thereof to the engine.

As a procedure of assembling the needles 31 to interiors of the pockets 43 in the cage 40, there are two procedures. In one procedure, the cage 40 is assembled to the support hole 4a of the rocker arm 4 in advance, and the needles 31 are then assembled into the pockets 43 of the cage 40. In the other procedure, the needles 31 are assembled into the pockets 43 of the cage 40 in advance, and the cage 40 is then assembled to the support hole 4a of the rocker arm 4. Thus, it is preferable to optimize the configuration of the pockets 43 depending upon the assembling procedure taken.

Figure 4:
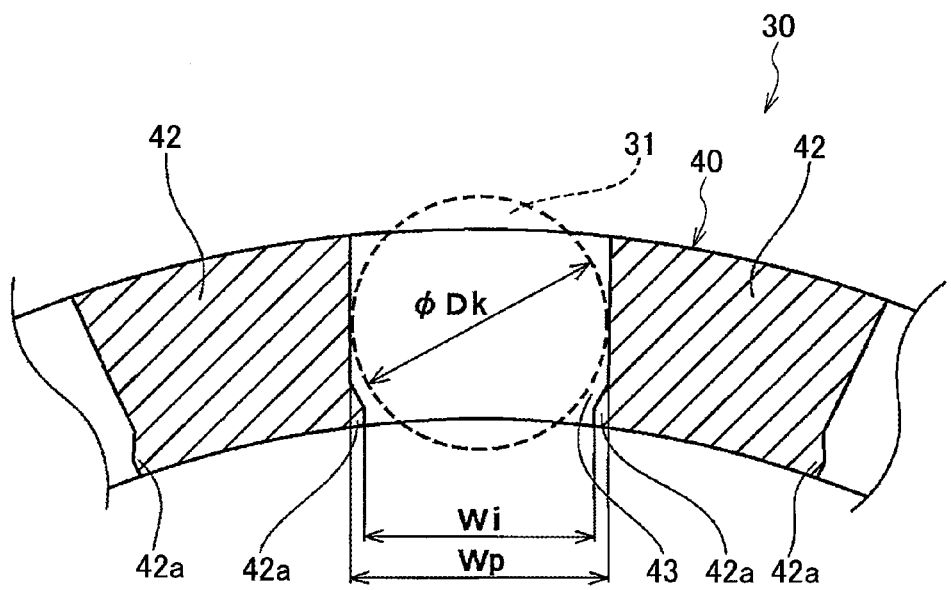
FIG. 4 is a main part enlarged sectional view showing a pocket configuration of the cage.

FIG. 4 shows a configuration of the pocket 43 that is preferable to be used when the needles 31 are incorporated into the pockets 43 after the cage 40 is assembled into the support hole 4a of the rocker arm 4. According to this configuration, radially inward locking projecting portions 42a are provided on radially inward side surfaces of each of the pillar portions 42. Then, the needle 31 is forced into the pocket 43 from a radially inward side of the cage 40 incorporated in the support hole 4a of the rocker arm 4 while elastically deforming the pillar portions 42 and the radially inward locking projecting portions 42a thereon to thereby be installed in the pocket 43.

In this cage 40, a circumferential width Wp of the pocket 43 at a portion that lies offset from the radially inward locking projecting portions 42a is greater than an outside diameter Dk of the needle 31 (Wp>Dk), and therefore, the needle 31 is allowed to roll in the pocket 43 with light force. A space Wi defined between distal end portions of the pair of radially inward locking projecting portions 42a is smaller than the outside diameter Dk of the needle 31 (Dk>Wi), and therefore, there is no such situation that the needle 31 is dislocated from the pocket 43.

Figure 5:
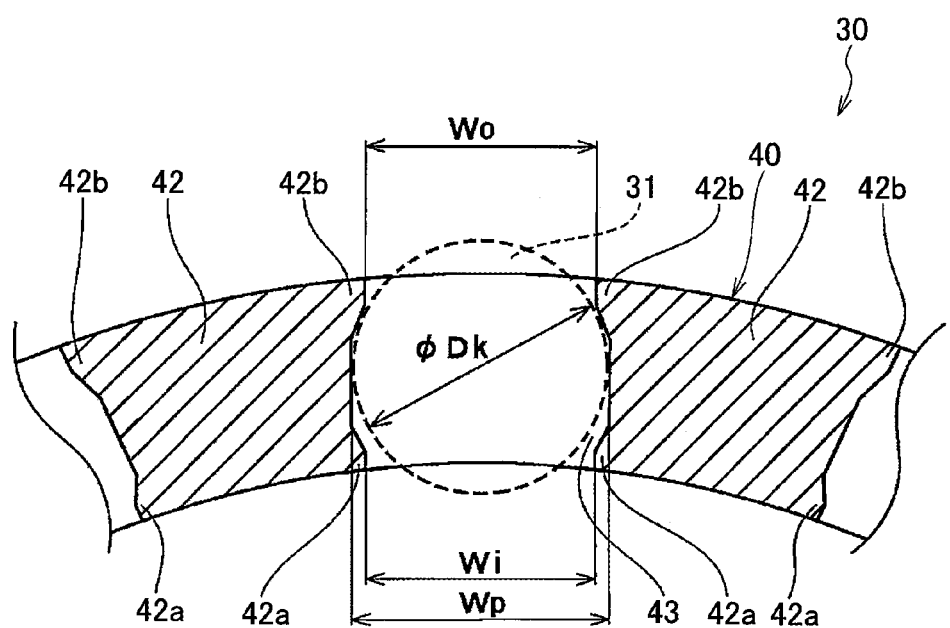
FIG. 5 is a main part enlarged sectional view showing another pocket configuration of the cage.

FIG. 5 shows a configuration of the pocket 43 that is preferable to be used when the cage 40 is incorporated into the support hole 4a of the rocker arm 4 after the needles 31 are assembled into the pockets 43 of the cage 40. In this configuration, radially inward locking projecting portions 42a are provided on radially inward side surfaces of each of the pillar portions 42, and radially outward locking projecting portions 42b are provided on radially outward side surface of each of the pillar portions 42. Then, the needle 31 is forced into the pocket 43 while elastically deforming the pillar portions 42 of the cage 40, the radially inward locking projecting portions 42a and the radially outward locking projecting portion 42b to thereby be installed in the pocket 43. Then, the cage 40 in which the needles 31 are installed in the pockets 43 is incorporated in the support hole 4a of the rocker arm 4.

In this case 40, a circumferential width Wp of the pocket 43 at a portion that is offset from the radially inward locking projecting portions 42a and the radially outward locking projecting portions 42b is greater than the outside diameter Dk of the needle 31 (Wp>Dk), and therefore, the needle 31 is allowed to roll in the pocket 43 with light force. A space Wi defined between distal end portions of the pair of radially inward locking projecting portions 42a is smaller than the outside diameter Dk of the needle 31 (Dk>Wi), and a space Wo defined between distal end portions of the pair of radially outward locking projecting portions 42b is smaller than the outside diameter Dk of the needle 31, and therefore, there is no such situation that the needle 31 held within the pocket 43 is dislocated from the pocket 43.

The radially inward locking projecting portions 42a and the radially outward locking projecting portions 42b may be formed along the full width of the pillar portions 42 may be formed at portions of the pillar portions 42 or further may be formed by dividing in the plural form. Further, axial positions of the radially inward locking projecting portions 42a and the radially outward locking projecting portions 42b do not have to coincide with each other.

As resins from which the cage 40 is formed, polyamides (nylon resins) such as aromatic polyamide (aromatic PA), polyamide 46, polyamide 6 and polyamide 66, and fluorine resin such as polyphenylene sulfide (PPS), polyether ether ketone (PEEK), polyacetal (POM) and polytetrafluoroethylene (PTFE) can be used. Additionally, mixtures in which a reinforcement material such as glass fiber or carbon fiber is mixed into those resins can also be used preferably. It is more preferable to use mixtures in which 5 to 30 percent by weight of glass fiber or carbon fiber is mixed into polyamide resin to provide a modulus of elasticity in bending ranging from 2000 to 5000 MPa. By using the mixtures in this range, the deformable portions can be made more deformable, and required rigidity can be ensured.

Thus, as has been described heretofore, according to the cage and rollers 30 of this embodiment, the outer circumferential surface 41a of at least one of the rim portions 41 of the cage 40 includes the engaging projecting portion 44 that is elastically deformed so as to be contracted in diameter when the cage 40 is inserted into the support hole 4a of the rocker arm 4 and which is elastically restored to be brought into engagement with the rocker arm 4 to thereby position the cage 40 in the axial direction relative to the rocker arm 4 after the cage 40 is inserted into support hole 4a. Owing to this, the cage 40 can easily be installed in the support hole 4a of the rocker arm 4 from the axial direction with the cage 40 kept pressed radially to be contracted in diameter. In addition, the cage 40 so installed is positioned relative to the rocker arm 4 in relation to the axial direction by the engaging projecting portion 44 being brought into engagement with the rocker arm 4.

Further, since the engaging projecting portion 44 is formed so as to extend along the full circumference of the outer circumferential surface 41a of the rim portion 41, the cage 40 is positioned in relation to the axial direction in a more ensured fashion.

In this embodiment, while the engaging projecting portion 44 is formed so as to extend along the full circumference of the rim portion 41, the engaging projecting portion 44 may be formed partially in the circumferential direction. In addition, a plurality of engaging projecting portions 44 may be formed in the circumferential direction.

Second Embodiment

Figure 6:
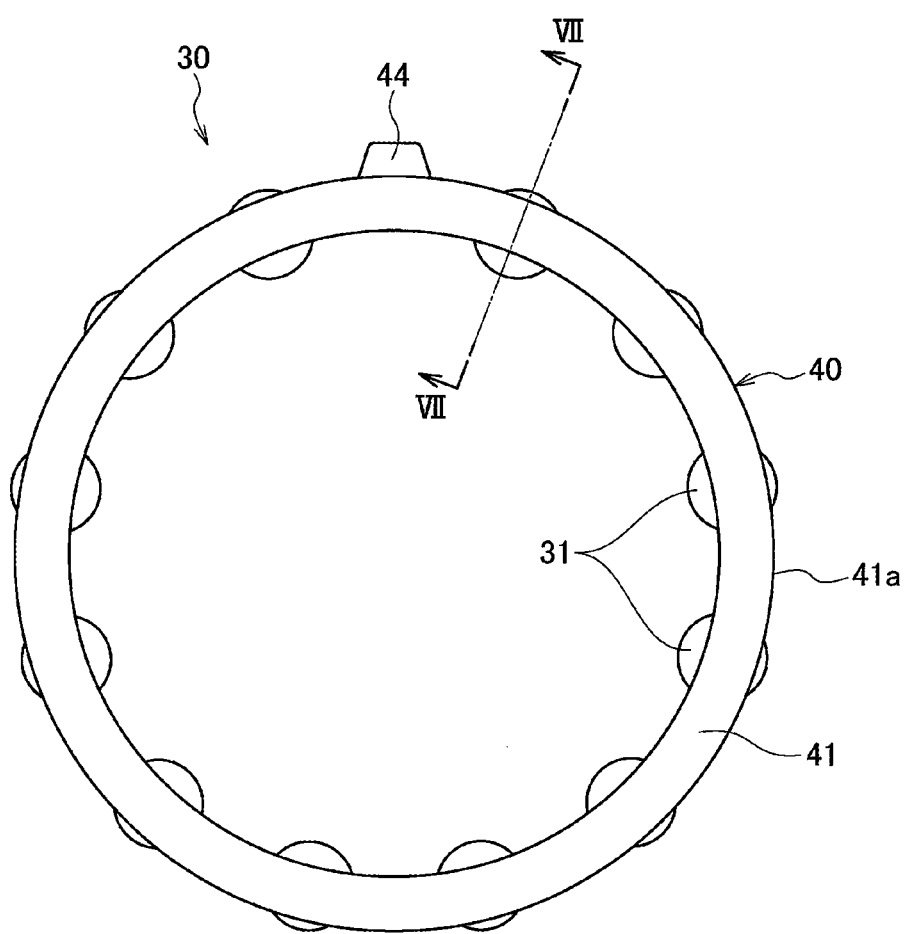
FIG. 6 is a side view of a cage and rollers according to a second embodiment of the invention.
Figure 7:
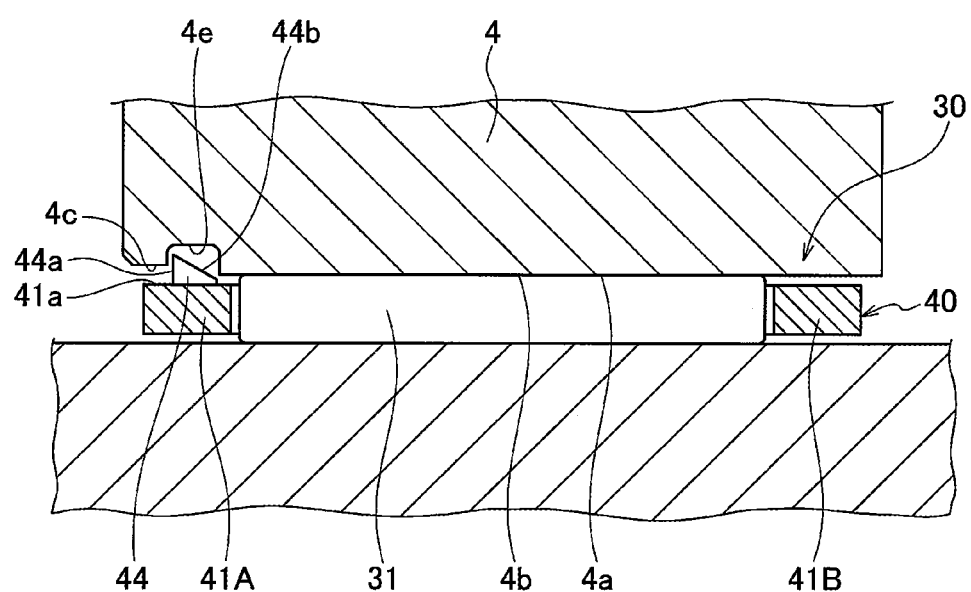
FIG. 7 is a main part sectional view taken along a line VII-VII in FIG. 6, which shows a state in which the cage and rollers shown in FIG. 6 is incorporated in an outer ring corresponding member.

Next, referring to FIGS. 6 and 7, a second embodiment of a cage and rollers 30 according to the invention will be described. Like reference numerals will be given to like or similar portions to those of the first embodiment in the drawings, so that the description thereof will be omitted or simplified.

A cage 40 of a cage and rollers 30 of this embodiment includes an engaging projecting portion 44 that projects radially outwards from an outer circumferential surface 41a of one rim portion 41A. The engaging projecting portion 44 has substantially a trapezoidal shape when viewed from an axial direction (refer to FIG. 6) and has substantially a triangular shape as shown in FIG. 7 when viewed from a circumferential direction, the substantially triangular shape being made up of a vertical wall 44a that rises vertically from an axially outer side of the outer circumferential surface 41a and an inclined surface 44b that gradually contracts in diameter as it extends axially inwards.

In a support hole 4a of a rocker arm 4 in which the cage and rollers 30 is incorporated, a large-diameter portion 4c is provided at an axial end portion that faces the rim portion 41A, and an annular groove 4e, which is an engaged portion, is provided at a boundary portion between the large-diameter portion 4c and a raceway surface 4b. The cage and rollers 30 is inserted into the support hole 4a of the rocker arm 4 from the other rim portion 41B that lies opposite to the engaging projecting portion 44, so that the inclined surface 44b is brought into abutment with the large-diameter portion 4c. Then, when the cage and rollers 30 is forced further in the axial direction, the one rim portion 41A is elastically deformed by the action of the inclined surface 44b of the engaging projecting portion 44 and is inserted into the support hole 4a of the rocker arm 4 while being contracted in diameter.

When the engaging projecting portion 44 reaches the annular groove 4e, the rim portion 41A that is contracted in diameter is elastically restored to its original state, whereby the vertical wall 44a and the inclined surface 44b of the engaging projecting portion 44 are brought into engagement with an outer surface and an inner surface of the annular groove 4e. Then, the cage and rollers 30 is positioned in relation to the axial direction relative to the rocker arm 4, and the cage and rollers 30 and the rocker arm 4 are restrained from being detached.

The other configurations and working effects of this embodiment are similar to those of the first embodiment.

In this embodiment, while the engaging projecting portion is described as being formed at the one location, a plurality of engaging projecting portions may be provided in the circumferential direction. Alternatively, the engaging projecting portion may be formed so as to extend along the full circumference of the rim portion 41A.

Third Embodiment

Figure 8:
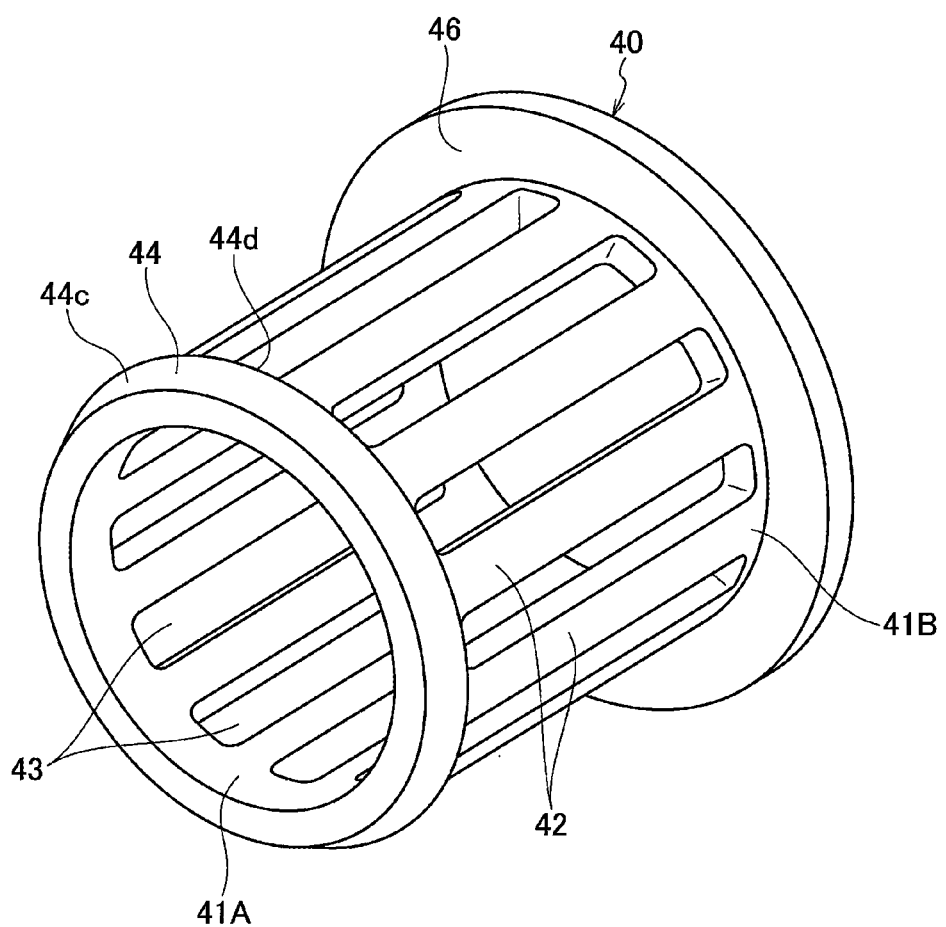
FIG. 8 is a perspective view of a cage making up a cage and rollers according to a third embodiment of the invention.
Figure 9:
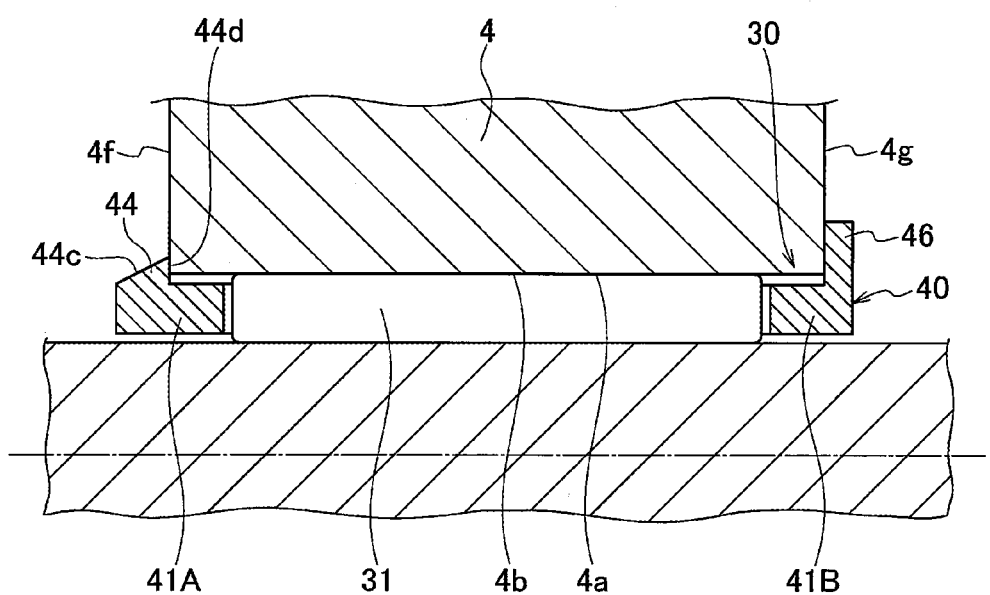
FIG. 9 is a main part sectional view showing a state in which the cage and rollers shown in FIG. 8 is incorporated in an outer ring corresponding member.

Next, referring to FIGS. 8 and 9, a third embodiment of a case and rollers 30 of the invention will be described. An engaging projecting portion 44 is provided on one rim portion 41A of a cage 40 of this embodiment. This engaging projecting portion 44 is made up of a circular conical inclined surface 44c that gradually expands in diameter axially inwards from an axial end face and a vertical wall 44d that extends along a radial direction from an axially inner side of the inclined surface 44c. A collar portion 46 is provided on an axial end face of the other rim portion 41B in such a way as to extend radially outwards.

The cage and rollers 30 of this embodiment is inserted into the support hole 4a of the rocker arm 4 by forcing the cage 40 into the support hole 4a of the rocker arm 4 from the side where the inclined surface 44c is provided while the one rim portion 41A is being elastically deformed to be contracted in diameter along the inclined surface 44c. Then, the vertical wall 44d is brought into engagement with one side surface 4f of the rocker arm 4, while the collar portion 46 is brought into engagement with the other side surface 4g of the rocker arm 4, whereby the cage and rollers 30 is positioned properly in relation to the axial direction relative to the rocker arm 4, and the cage and rollers 30 and the rocker arm 4 are restrained from being detached from each other.

Thus, as has been described heretofore, according to the cage and rollers 30 of this embodiment, since the collar portion 46 is provided on the other rim portion 41B of the cage 40 which can be brought into abutment with the side surface 4g of the rocker arm 4, the collar portion 46 is brought into abutment with the other side surface 4g of the rocker arm 4, and the vertical wall 44d formed on the one rim portion 41A is brought into engagement with the side surface 4f of the rocker arm 4, whereby the cage and rollers 30 is positioned properly in relation to the axial direction in an ensured fashion.

The other configurations and working effects of this embodiment are similar to those of the first embodiment.

The collar portion 46 may be configured in such a way that an outside diameter is smaller than a large-diameter portion 4c of the rocker arm 4 as shown in FIG. 3 so as to be disposed inside the support hole 4a, so that the collar portion 46 is brought into abutment with or faces a side surface that is formed on a step portion 4d of the rocker arm 4.

Fourth Embodiment

Figure 10:
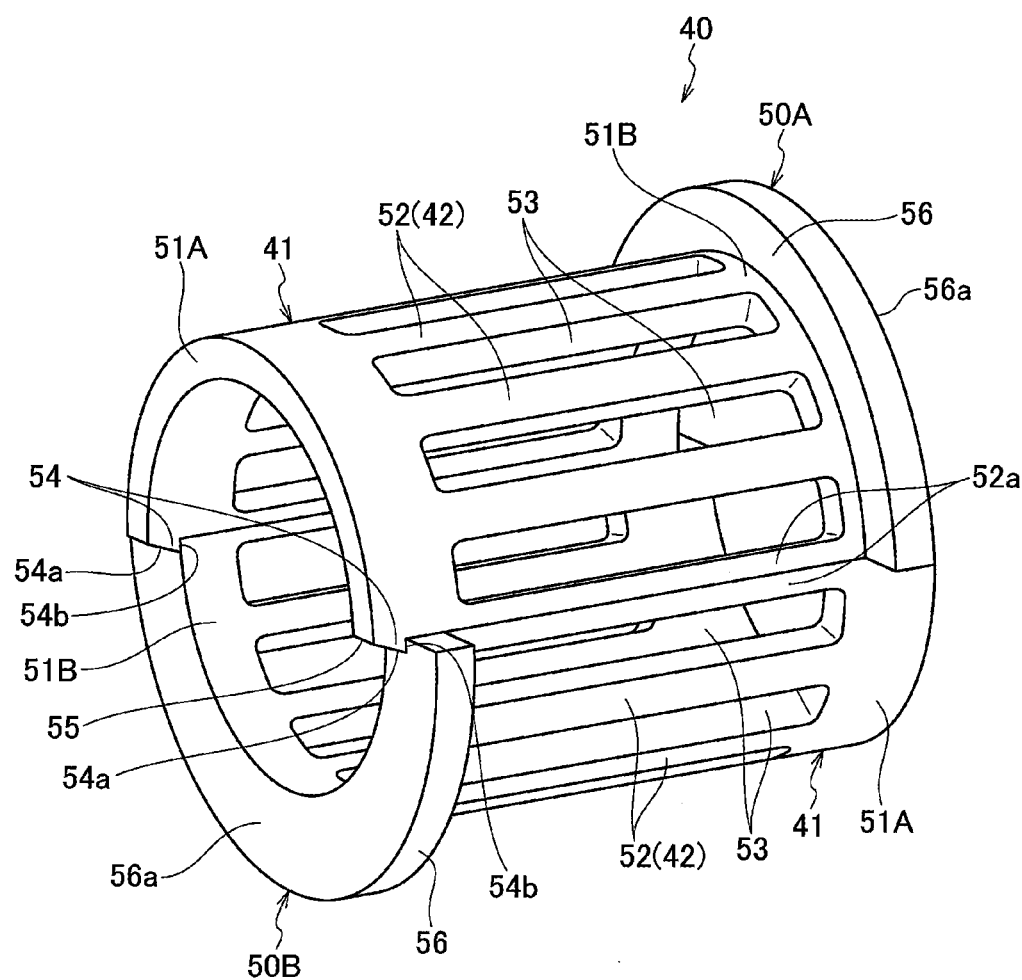
FIG. 10 is a perspective view of a cage making up a cage and rollers according to a fourth embodiment of the invention.
Figure 11:
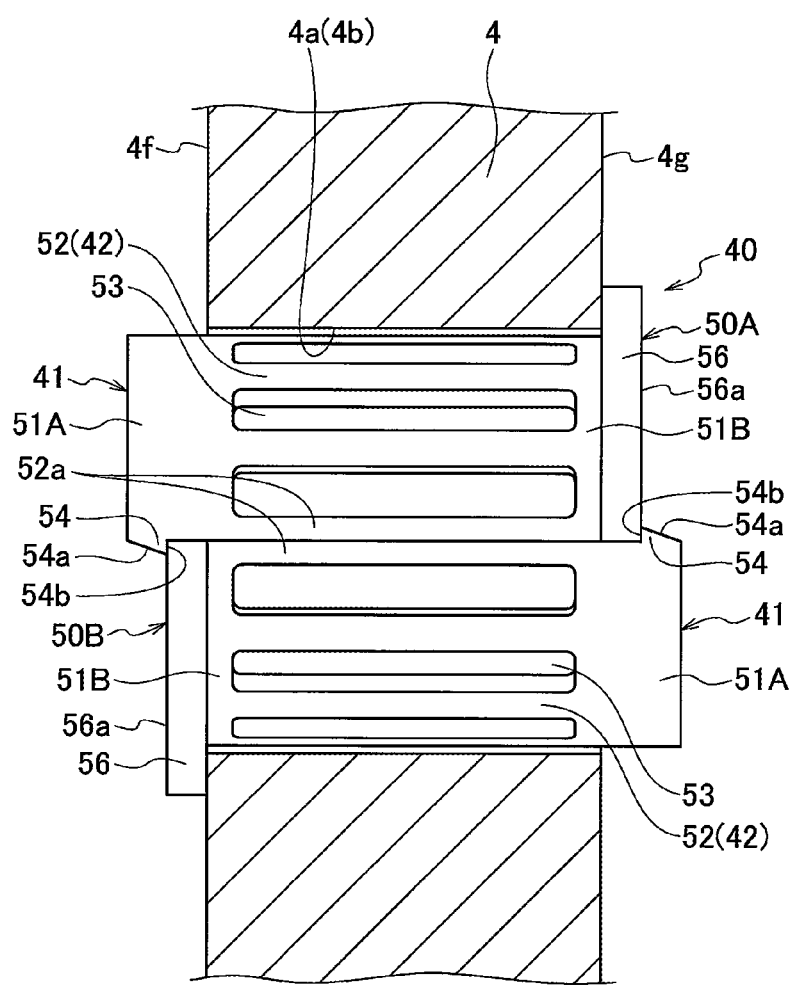
FIG. 11 shows a view showing a state in which the cage and rollers shown in FIG. 10 is incorporated in a outer ring corresponding member.
Figure 12:
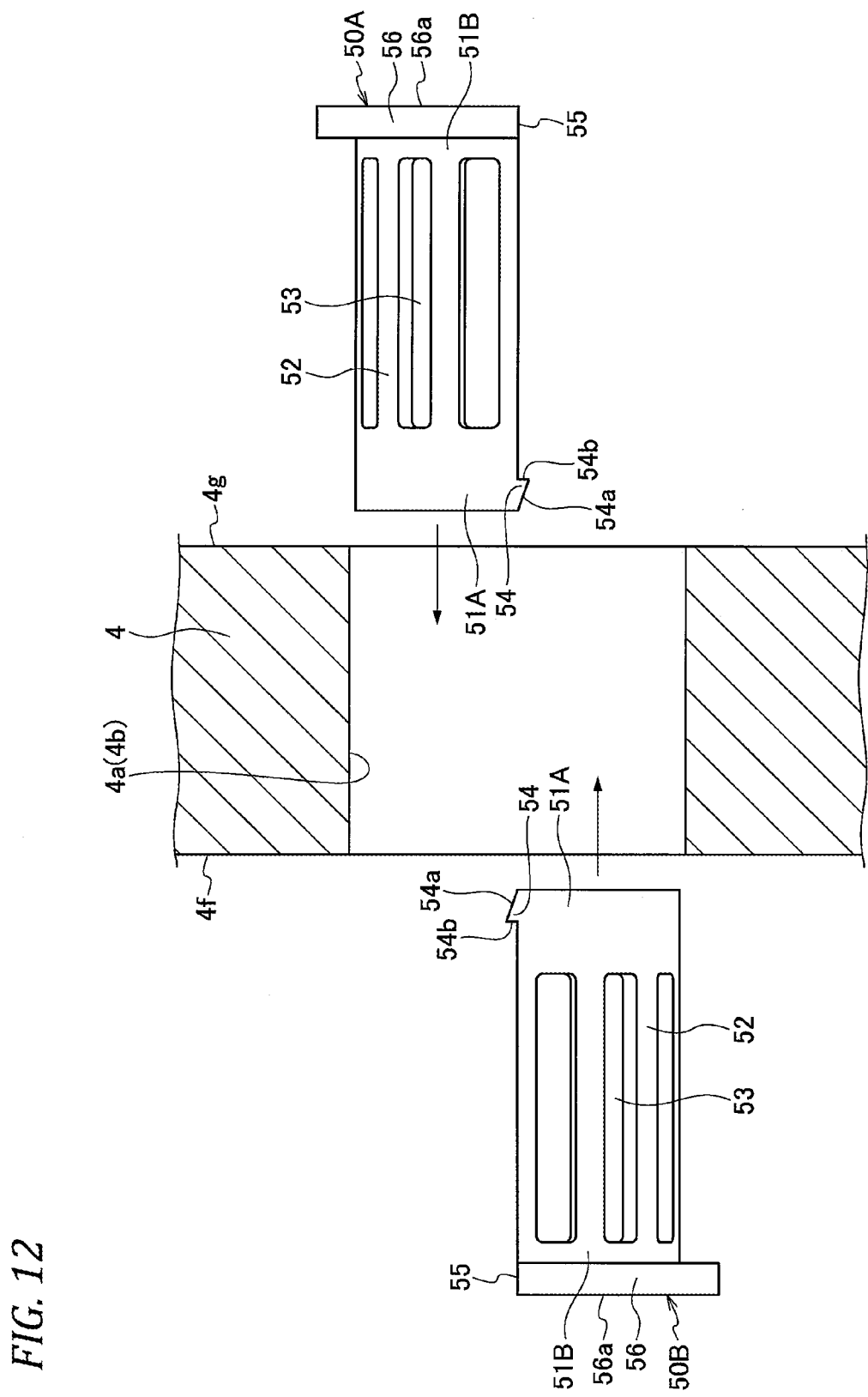
FIG. 12 is an explanatory view showing a procedure of incorporating the cage and rollers shown in FIG. 10 into the outer ring corresponding member.

Next, referring to FIGS. 10 to 12, a fourth embodiment of a cage and rollers 30 according to the invention will be described. FIG. 10 is a perspective view of a cage that is made by combining a pair of cage elements, FIG. 11 is a view showing a state in which a cage and rollers is incorporated in a rocker arm (a outer ring corresponding member), and FIG. 12 is an explanatory view showing a procedure of incorporating the cage and rollers into the rocker arm.

A cage 40 of this embodiment has a configuration in which a pair of substantially semi-cylindrical cage elements 50A, 50B having the same shapes are combined into a cylindrical shape. The cage elements 50A, 50B each include first and second semi-annular rim portions 51A, 51B that are provided so as to be spaced apart from each other in an axial direction and a plurality of pillar portions 52 that are disposed at intervals in a circumferential direction between the rim portions 51A, 51B. A plurality of pockets 53 are defined to be formed by the pillar portions 52 that lie adjacent to one another in the circumferential direction and the rim portions 51A, 51B.

In this embodiment, a circumferential width of the pillar portions 52a that form respective circumferential end faces 55 of the cage elements 50A, 50B is one half a circumferential width of the other pillar portions 52. This makes a total width of the pillar portions 52a that come to contact each other when the cage elements 50A, 50B are combined together equal to the circumferential width of the other pillar portions 52.

Substantially triangular engaging projecting portions 54 are provided individually on the circumferential end faces 55 of the first rim portion 51A of the rim portions 51A, 51B of each of the cage elements 50A, 50B, and the engaging projecting portions 54 each include an inclined surface 54a that is inclined so that its height increases gradually as it extends axially inwards from an axial end face and a vertical wall 54b that extends from an axially inner side surface of the inclined surface 54a along a radial direction. Additionally, a collar portion 56 extends radially outwards and the outer side surface 56a of the collar portion 56, functions as an engaged portion with which the engaging projecting portions 54 are brought into engagement, are provided on the other rim portion 56B.

The pair of cage elements 50A, 50B each having the configuration described above are inserted into a support hole 4a of the outer ring corresponding member from opposite directions to each other so that the first rim portion 51A of the one cage element 50A faces the second rim portion 51B of the other cage element 50B while the second rim portion 51B of the one cage element 50A faces the first rim portion 51A of the other cage element 50B. Additionally, the circumferential end faces 55 of the first rim portion 51A and the circumferential end faces 55 of the second rim portion 51B are superposed on each other in the circumferential direction so that the cage elements 50A, 50B are formed into a cylindrical shape, and in each of the engaging projecting portions 54 of the first rim portion 51A is engaged to the outer side surface 56a of the collar portion 56 of the second rim portion 51B which is the engaged portion whereby the cage 40 is built up.

Namely, as shown in FIG. 12, the pair of cage elements 50A, 50B are disposed on a left hand and right hand sides of the rocker arm 4 and are then inserted into the support hole 4a of the rocker arm 4 from the first rim portion 51 side where the engaging projecting portions 54 are provided until the collar portions 56 of both the cage elements 50A, 50B are brought into abutment with side surfaces 4f, 4g of the rocker arm 4. By doing so, the engaging projecting portions 54 of both the cage elements 50A, 50B are elastically restored to thereby be brought into engagement with the outer side surfaces 56a of the collar portions 56 of the corresponding cage elements 50A, 50B (refer to FIG. 11).

Consequently, both the cage elements 50A, 50B are positioned properly in relation to the axial direction by the collar portions 56 that are brought into abutment with the side surfaces 4f, 4g of the rocker arm 4 and the engaging projecting portions 54 that are brought into engagement with the outer side surfaces 56a of the collar portions 56 of the corresponding cage elements 50A, 50B and are assembled to the rocker arm 4 while being restrained from being detached from each other whereby the cage 40 is built up.

In this embodiment, too, the cage 40 may be assembled to the support hole 4a of the rocker arm 4 in advance, so that needles 31 are then assembled into the pockets 53 of the cage 40. Alternatively, the needles 31 may be assembled into the pockets 53 of the cage 40 in advance, so that the cage 40 is then assembled into the support hole 4a of the rocker arm 4.

Thus, as has been described heretofore, according to the cage and rollers 30 of this embodiment, the cage 40 is made up of the pair of substantially semi-cylindrical cage elements 50A, 50B having the same shapes. The pair of cage elements 50A, 50B each include the first rim portion 51A having the pair of engaging projecting portions 54 that project circumferentially from both the circumferential end faces thereof and the second rim portion 51B having the collar portion 56 that has the outer side surface 56a that makes up the pair of engaged portions that can be brought into engagement with the engaging projecting portions 54 at both circumferential end faces thereof and which can be brought into abutment with or face the side surfaces 4f, 4g of the rocker arm 4, and the plurality of pillar portions 52 that are disposed at intervals in the circumferential direction between the first and second rim portions 51A, 51B. Then, the engaging projecting portions 54 and the outer side surfaces 56a of the collar portions 56 are brought into engagement with each other, so that a pair of rim portions 41 are made up of the one first rim portion 51A of the pair of cage elements 50A, 50B and the other second rim portion 51B of the pair of cage elements 50A, 50B, and the other or first rim portion 51A of the pair of cage elements 50A, 50B and the one second rim portion 51B of the pair of cage elements 50A, 50B, whereby the cage 40 is formed into the cylindrical shape. Further, the collar portions 56 of the pair of cage elements 50A, 50B are brought into abutment with or face individually the side surfaces 4f, 4g of the rocker arm 4. In this case, too, the cage 40 can easily be installed in the support hole 4a of the rocker arm 4 from the axial direction. Additionally, the cage 40 so installed can be positioned properly in relation to the axial direction as a result of the collar portions 56 of the pair of cage elements 50A, 50B being brought into abutment with or facing the side surfaces 4f, 4g of the rocker arm 4. Further, by assembling together the cage elements 50A, 50B having the same shapes from the left and right opposite directions, it is possible to configure the cage 40 with a good weight balance.

In this embodiment, too, a configuration may be adopted in which the collar portions 56 are given an outside diameter that is smaller than the large-diameter portion 4c of the rocker arm 4 shown in FIG. 3, so that the collar portions 56 are disposed inside the support hole 4a to be brought into abutment with or face side surfaces formed at step portions 4d of the rocker arm 4.

Fifth Embodiment

Figure 13:
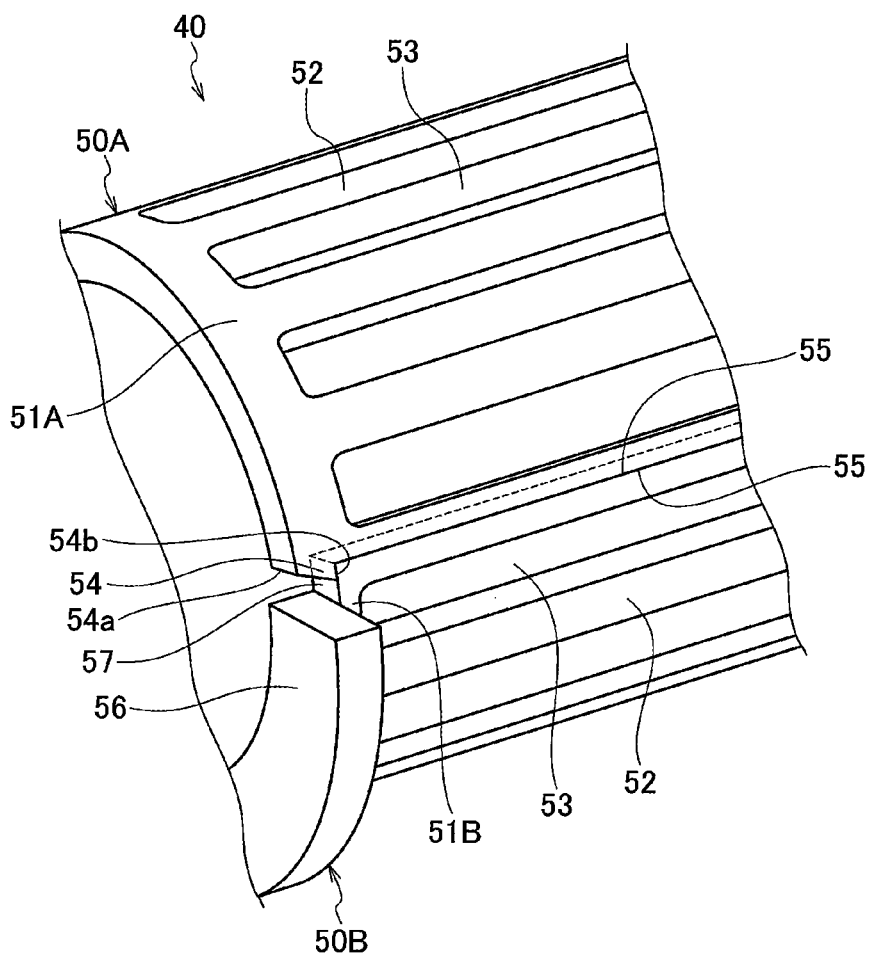
FIG. 13 is a main part enlarged perspective view showing an engaging projecting portion and an engaged portion of a cage and rollers according to a fifth embodiment.
Figure 14:
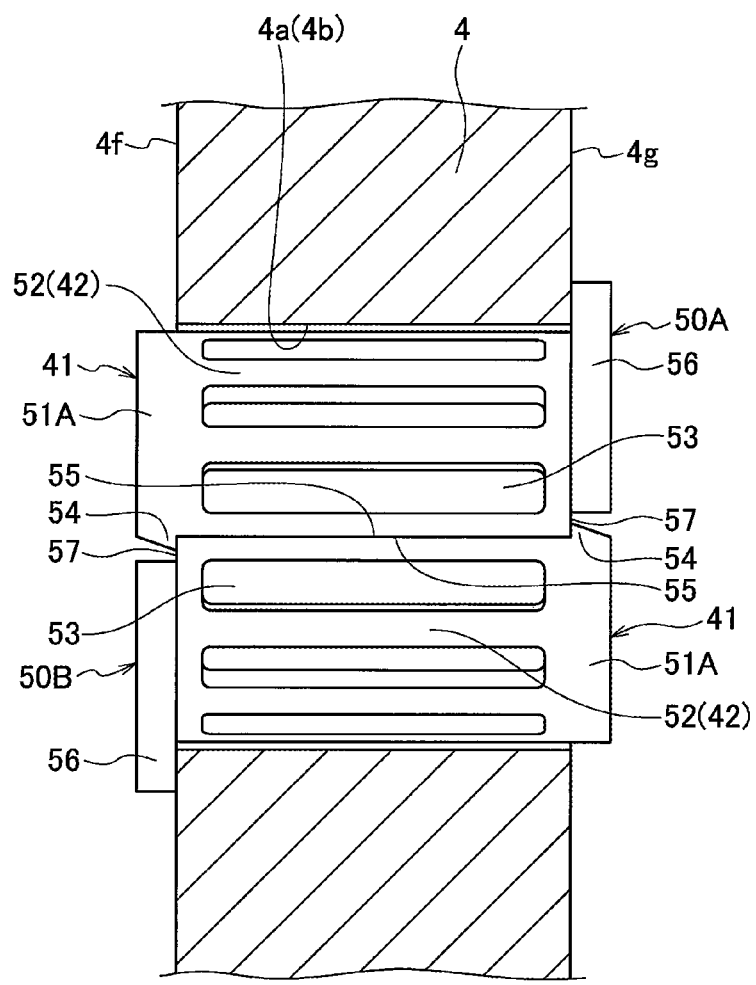
FIG. 14 is a view showing a state in which the cage and rollers shown in FIG. 13 is incorporated in an outer ring corresponding member.

Next, referring to FIGS. 13 and 14, a fifth embodiment of a cage and rollers 30 according to the invention will be described.

Similar to the cage 40 of the fourth embodiment, a cage 40 of a fifth embodiment has a pair of cage elements 50A, 50B that are assembled together. In the cage 40 of this embodiment, axial side surfaces of step portions that are formed by spacing collar portions 56 of the cage elements 50A, 50B from circumferential end faces 55 in a circumferential direction are used as engaged portions 57 that are brought into engagement with engaging projecting portions 54 of the corresponding cage elements 50A, 50B.

By adopting this configuration, in the cage and rollers 30 of the fourth embodiment, the axial side surface of the first rim portion 51A projects more in the axial direction than the axial side surface of the second rim portion 51B (the outer side surface 56a of the collar portion 56) (refer to FIG. 11). In contrast with this, in the cage and rollers 30 of this embodiment, the axial side surface of the first rim portion 51A becomes level with the axial side surface of the second rim portion 51B, whereby the cage and rollers 30 of this embodiment becomes smaller in size.

The other configurations and working effects of this embodiment are similar to those of the fourth embodiment.

Sixth Embodiment

Next, referring to FIGS. 15 to 18, a sixth embodiment of a cage and rollers 30 according to the invention will be described. Like reference numerals will be given to like or similar portions to those of the first embodiment, and the description thereof will be omitted or simplified here.

Figure 16:
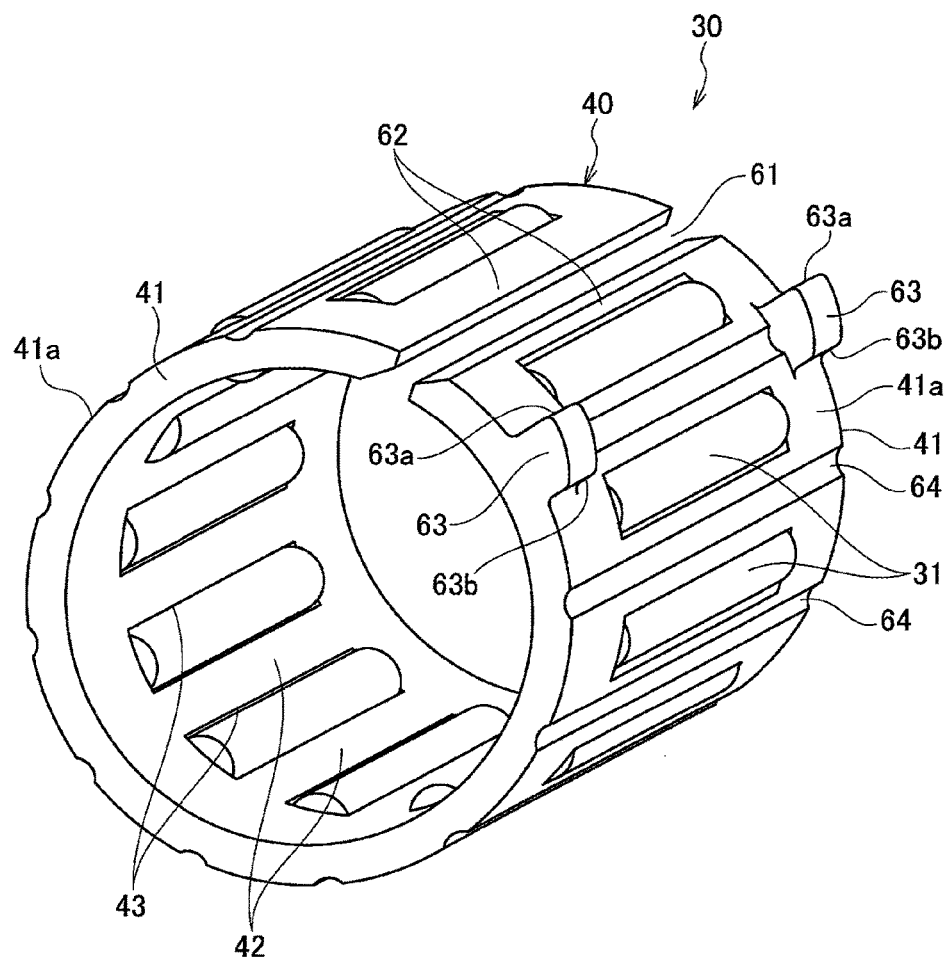
FIG. 16 is a perspective view of the case and rollers according to the sixth embodiment.
Figure 17:
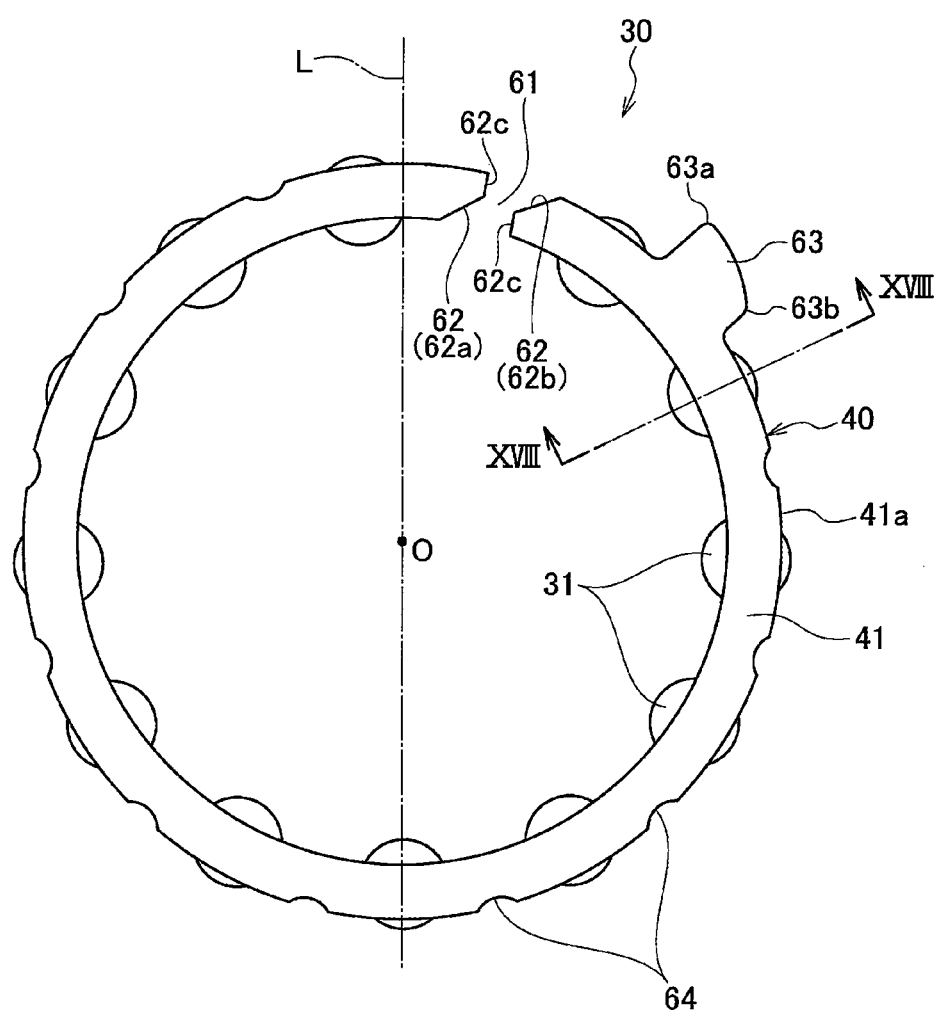
FIG. 17 is a side view of the cage and rollers shown in FIG. 16.

As shown in FIGS. 15 to 17, a cage and rollers 30 of this embodiment also includes a plurality of needles 31 that are rolling elements and a resin cage 40 that holds the plurality of needles 31 so as to roll freely.

The cage 40 includes a pair of annular rim portions 41 that are provided so as to be spaced apart in an axial direction from each other and a plurality of pillar portions 42 that are disposed at intervals in a circumferential direction between both the rim portions 41. Then, a plurality of pockets 43 are defined to be formed by the pillar portions 42 that lie adjacent to one another in the circumferential direction and both the rim portions 41. A plurality of needles 31 are held individually in the plurality of pockets 43 so as to roll freely therein.

A slit 61 is provided in the cage 40, and this slit 61 extends along the axial direction so as to divide the cage 40 (both the rim portions 41 and the pillars 42) in the circumferential direction. Owing to this, as shown in FIG. 17, the cage 40 is formed into a C-like shape in cross section and can be elastically deformed in a radial direction. Circumferential end portions 62, 62 of the cage 40 that define the slit 61 and which face each other in the circumferential direction are tapered so as to be inclined in the same direction relative to a straight line L that passes through a center O of the cage 40 to extend diametrically. Namely, in the circumferential end portion 62a, a radially outer portion constitutes a distal end in the circumferential direction, and in the circumferential end portion 62b, a radially inner portion constitutes a distal end in the circumferential direction.

In this embodiment, a flat surface 62c is formed on the radially outer portion of the circumferential end portion 62a, and the radially inner portion of the circumferential end portion 62b, and this flat surface 62c has a radial dimension that is one half a cage thickness or smaller. However, in place of providing the flat surfaces 62c thereon, the radially outer portion of the circumferential end portion 62a and the radially inner portion of the circumferential end portion 62b may be formed into the shape of a curved surface. Alternatively, the radially outer portion of the circumferential end portion 62a may be tapered continuously to a outer circumferential surface of the circumferential end portion 62a, and the radially inner portion of the circumferential end portion 62b may be tapered continuously to an inner circumferential surface of the circumferential end portion 62b.

In addition, a pair of engaging projecting portions 63 are formed individually on outer circumferential surfaces 41a of both the rim portions 41 in circumferential identical positions that lie closer to the circumferential end portion 62b. The pair of engaging projecting portions 63 project radially outwards from the outer circumferential surfaces 41a of the rim portions 41 and are positioned radially outwards of a support hole 4a before they are elastically deformed.

Radially outer surfaces of the pair of engaging projecting portions 63 are formed into an arc-like shape so that a circumferential slit side edge portion 63a is positioned further radially outwards than an edge portion 63b that lies opposite thereto as seen in the circumferential direction. Owing to this, the radially outer surfaces of the pair of engaging projecting portions 63 tend to be equal over their circumferential length in a distance from the center of the cage 40 with the cage 40 contracted in diameter so that the circumferential end portions 62, 62 of the slit 61 are brought into contact with each other to be superposed on each other in a radial direction.

In addition, arc-shaped recessed grooves 64 are formed on outer circumferential surfaces of both the rim portions 41 and the pillar portions 42 so as to extend along a full axial length.

Figure 18:
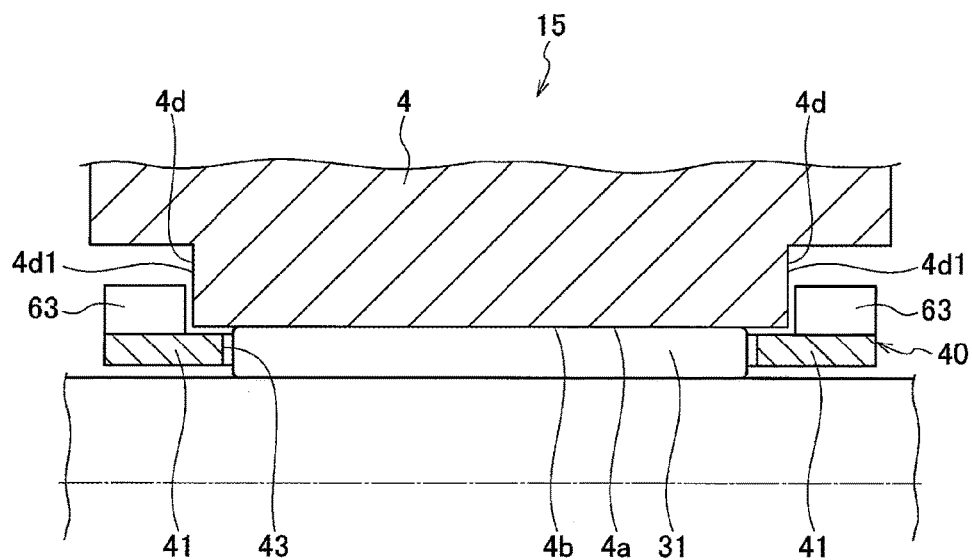
FIG. 18 is a sectional view of the cage and rollers that is assembled to an outer ring corresponding member taken along the line XVIII-XVIII shown in FIG. 17.

The cage and rollers 30 that is configured in the way described heretofore is installed in the support hole 4a of the engine rocker arm 4 for assemblage as a rocker arm unit 15 as shown in FIGS. 15 and 18.

The cage and rollers 30 is inserted into the support hole 4a of the rocker arm 4 by pressing the resin cage 40 from a radially outer side thereof so as to elastically deform the cage 40 to such an contraction of the diameter that one of the engaging projecting portions 63 can pass through the support hole 4a. As this occurs, since the circumferential end portions 62, 62 are tapered to be inclined relative to the straight line L that passes through the center O of the cage 40 to extend diametrically, the radially outer circumferential end portion 62a of the circumferential end portions 62, 62 is brought into contact with the other radially inner circumferential end portion 62b to be superposed thereon in the radial direction, whereby the cage 40 can easily be contracted in diameter (refer to FIG. 17).

Then, the pressing force exerted on the cage 40 is released after the cage 40 is inserted into the support hole 4a, whereupon the cage 40 is elastically restored to its original state. Then, as shown in FIG. 18, the pair of engaging projecting portions 63 that are formed on the outer circumferential surface 41a of both the rim portions 41 are brought into engagement with side surfaces 4d1 of step portions 4d of the rocker arm 4, whereby the cage and rollers 30 is positioned properly in the axial direction relative to the rocker arm 4, and the cage and rollers 30 and the rocker arm 40 are restrained from being detached from each other. This enables the cage and rollers 30 to be positioned properly in relation to the axial direction without working particularly on the rocker arm 4, thereby making it possible to suppress the production cost of the cage and rollers 30.

In general, since the rocker arm 4 is carburized, an inner circumferential surface of the support hole 4a can be used as an outer ring raceway 4b, and the cage and rollers 30 that includes no outer ring can be used. Consequently, a radial thickness of the cage and rollers 30 is determined by a diameter of the needles 31, and therefore, a radial thickness of a bearing portion is reduced, and hence, the rocker arm unit 15 can be reduced in size.

The cage and rollers 30 and the rocker arm 4 can be assembled into the rocker arm unit 15, so that the cage and rollers 30 and the rocker arm 4 can be delivered from the rocker arm manufacturer to an engine manufacturer in the form of the rocker arm unit 15, whereby not only can the cage and rollers 30 and the rocker arm 4 be handled easily but also the cage and rollers 30 and the rocker arm 4 can easily be assembled to an engine as the rocker arm unit 15, this improving the assembling efficiency thereof to the engine.

In this embodiment, too, the cage 40 may be assembled into the support hole 4a of the rocker arm 4 in advance, so that the needles 31 are assembled into the pockets 43 of the cage 40 afterwards. Alternatively, the needles 31 may be assembled into the pockets 43 of the cage 40 in advance, so that the cage 40 is assembled into the support hole 4a of the rocker arm 4 afterwards.

Thus, as has been described heretofore, according to the cage and rollers 30 of this embodiment, the slit 61 is formed in the cage 40 to divide the cage 40 in the circumferential direction so that the cage 40 can be contracted in diameter. The cage 40 includes the engaging projecting portions 63 that are formed on the outer circumferential surfaces 41a of the rim portions 41 so as to project radially outwards therefrom to thereby be brought into engagement with the rocker arm 4 (the outer ring corresponding member), thereby positioning properly the cage 40 in the axial direction relative to the rocker arm 4. Thus, the cage 40 can easily be installed in the support hole 4a of the rocker arm 4 from the axial direction by pressing the cage 40 radially inwards so that the cage 40 is contracted in diameter. Additionally, the engaging projecting portions 63 of the cage 40 that is installed in the support hole 4a are brought into engagement with the both side surfaces 4d1 of the rocker arm 4, whereby the cage 40 is positioned properly in relation to the axial direction.

The circumferential end portions 62, 62 of the cage 40 which define the slit 61 are tapered so as to be inclined relative to the straight line L that passes through the center O of the cage 40 to extend diametrically. Therefore, compared with a case where the circumferential end portions 62, 62 are formed parallel to the straight line L that passes through the center O of the cage 40 to extend diametrically, in contracting the cage 40 in diameter, the one circumferential end portion 62a of the cage 40 acts to push radially downs the other circumferential end portion 62b, whereby the cage 40 can easily be contracted in diameter.

The radially outer surfaces of the pair of engaging projecting portions 63 are formed so that the circumferential slit side edge portion 63a is positioned further radially outwards than the edge portion 63b that lies opposite thereto as seen in the circumferential direction. Owing to this, a great radial lapping height can be ensured when the engaging projecting portions 63, 63 are brought into engagement with the both side surfaces 4d1 of the rocker arm 4. Additionally, when the cage 40 is contracted in diameter in an attempt to be inserted into the support hole 4a of the rocker arm 4, the interference of the engaging projecting portions 63 with the support hole 4a can be avoided, thereby making is possible for the cage 40 to enter easily the support hole 4a.

Further, the cage and rollers 30 is installed in the support hole 4a of the engine rocker arm 4 as the outer ring corresponding member, thereby making it possible to reduce the working torque of the rocker arm 4.

In the embodiment, while the pair of engaging projecting portions 63 are described as being formed on the outer circumferential surfaces 41a of the both rim portions 41 so as to project radially outwards therefrom to thereby being brought into engagement with the side surfaces 4d1 of the rocker arm 4, the engaging projecting portion 63 may be provided on either of the rim portions 41. As this occurs, the rocker arm 4, which is the outer ring corresponding member, is worked on to form a recess portion thereon for engagement with the engaging projecting portion 63.

Modified Example

Figure 19:
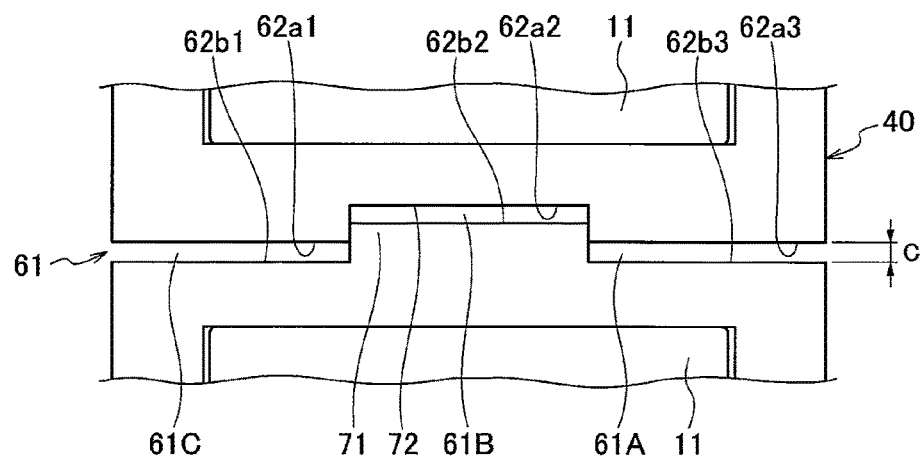
FIG. 19 is a main part enlarged view of a cage showing a slit configuration of a modified example made to the sixth embodiment as viewed from a radially outer side.

FIG. 19 is a view showing a slit configuration of a cage according to a modified example made to the embodiment described above. A slit 61 of a cage 40 of the modified example includes three slits 61A, 61B, 61C that are offset in a circumferential direction. The slit 61B formed centrally in an axial direction is offset from the slits 61A, 61C that lie on both sides thereof a greater distance than a width C of the slits 61A, 61C in the circumferential direction.

Specifically, circumferential end portions 62a2, 62b2 of the cage 40 that define the slit 61B are formed as end portions that project further in the circumferential direction than circumferential end portions 62a1, 62b1, 62a3, 62b3 of the cage 40 that define the slits 61A, 61C or as end portions that are formed to be recessed to constitute end portions of a projecting portion 71 and a recessed groove 72. The projecting portion 71 fits in the recessed groove 72, and the circumferential end portions 62a1 to 62a3, 62b1 to 62b3 of the cage 40 that define the three slits 61A, 61B, 61C overlap or cross each other as seen from an axial direction. By adopting this configuration, an axial displacement of the circumferential end portions of the cage 40 at the slit 61 can be suppressed that would otherwise be generate.

Thus, as has been described heretofore, the circumferential end portions 62a1 to 62a3, 62b1 to 62b3 of the cage 40 that define the slit 61 are formed so as to overlap each other as seen from the axial direction, it is possible to suppress the axial displacement of the circumferential end portions that would otherwise be generated in contracting the cage 40 in diameter.

The other configurations and working effects of this modified example are similar to those of the embodiment. For example, the circumferential end portions 62a1 to 62a3, 62b1 to 62b3 of the cage 40 may be formed into a flat or tapered configuration as with the sixth embodiment that has been described just above.

The invention is not limited to the embodiments that have been described heretofore but can be modified and improved as required.

For example, the outer ring corresponding member in which the cage and rollers 30 is incorporated is not limited to the rocker arm 4. Thus, the invention can equally be applied to an outer ring or a housing that does not have a guide portion that controls the axial position of the cage and rollers 30.

This patent application is based on Japanese Patent Application No. 2013-258989 filed on Dec. 16, 2013 and Japanese Patent Application No. 2014-011789 filed on Jan. 24, 2014, the contents of which are incorporated herein by reference.

DESCRIPTION OF REFERENCE NUMERALS AND SIGNS

4: rocker arm (outer ring corresponding member)
4a: support hole (rotational support portion)

4b: raceway surface
4f, 4g: side surface
30: cage and rollers
31: needle (rolling element)
40: cage
41, 41A, 41B: rim portion
41a: outer circumferential surface
42, 52: pillar portion
43, 53: pocket
44, 54, 63: engaging projecting portion
46, 56: collar portion
50A, 50B: cage element
51A: first rim portion
51B: second rim portion
55: circumferential end face
57: engaged portion
61, 61A, 61B, 61C: slit
62, 62a, 62b, 62a1 to 62a3, 62b1 to 62b3: circumferential end portion
63a: slit side edge portion
63b: edge portion opposite to slit
L: straight line extending in radial direction
O: cage center

The invention claimed is:

1. A cage and rollers comprising:
a plurality of needles that are rolling elements; and
a resin cage comprising a pair of annular rim portion that are provided so as to be spaced apart in an axial direction from each other and a plurality of pillar portions that are disposed at intervals in a circumferential direction between the rim portions, the pillar portions that lie adjacent to one another in the circumferential direction and the rim portions defining a plurality of pockets in which the plurality of needles are held to roll freely, and configured to be installed in an outer ring corresponding member having a support hole whose inner circumferential surface constitutes a raceway surface for the needles, the cage and rollers, wherein:
the cage is made up of a pair of substantially semi-cylindrical cage elements having the same shapes;
the pair of cage elements each comprise a first rim portion having a pair of engaging projecting portions that project in the circumferential direction from circumferential end faces thereof, a second rim portion having on circumferential end faces thereof a pair of engaged portions that can be brought into engagement with the engaging projecting portions and a collar portion that can be brought into abutment with or face a side surface of the outer ring corresponding member, and a plurality of pillar portion that are disposed at intervals in the circumferential direction between the first and second rim portions;
the cage is formed into a cylindrical shape by bringing the engaging projecting portions into engagement with the engaged portions and making up a pair of rim portions by the one or first rim portion of the pair of cage elements and the other or second rim portion of the pair of cage elements, and the other or first rim portion of the pair of cage elements and the one or second rim portion of the pair of cage elements; and
the collar portions of the pair of cage elements are brought into abutment with or face both the side surfaces of the outer ring corresponding member.

2. The cage and rollers according to claim 1, wherein:
the engaged portions are made up of axial side surfaces of step portions that are formed by spacing the collar portions in the circumferential direction from the circumferential end faces; and
the axial side surface of the first rim portion and the axial side surface of the second rim portion become level with each other.

3. A cage and rollers comprising:
a plurality of needles that are rolling elements; and
a resin cage comprising a pair of annular rim portion that are provided so as to be spaced apart in an axial direction from each other and a plurality of pillar portions that are disposed at intervals in a circumferential direction between the rim portions, the pillar portions that lie adjacent to one another in the circumferential direction and the rim portions defining a plurality of pockets in which the plurality of needles are held to roll freely, and configured to be installed in an outer ring corresponding member having a support hole whose inner circumferential surface constitutes a raceway surface for the needles, the cage and rollers, wherein:
a slit is formed in the cage which divides the cage in the circumferential direction so that the cage can be contracted in diameter;
the cage comprises engaging projecting portions that are formed on outer circumferential surfaces of the rim portions so as to project radially outwards therefrom to be brought into engagement with the outer ring corresponding member, to thereby position the cage properly in relation to the axial direction relative to the outer ring corresponding member;
circumferential end portions of the cage that define the slit are tapered so as to be inclined relative to a straight line that passes through a center of the cage to extend diametrically so that a radially outer portion constitutes a distal end in the circumferential direction in the one circumferential end portion, and a radially inner portion constitutes a distal end in the circumferential direction in another circumferential end portion; and
the engaging projecting portions are formed on positions that lie closer to the another circumferential end portion.

4. The cage and rollers according to claim 3, wherein circumferential end portions of the cage that define the slit are formed so as to overlap each other when seen from the axial direction.

5. A cage and rollers comprising:
a plurality of needles that are rolling elements; and
a resin cage comprising a pair of annular rim, portion that are provided so as to be spaced apart in an axial direction from each other and a plurality of pillar portions that are disposed at intervals in a circumferential direction between the rim portions, the pillar portions that lie adjacent to one another in the circumferential direction and the rim portions defining a plurality of pockets in which the plurality of needles are held to roll freely, and configured to be installed in an outer ring corresponding member having a support hole whose inner circumferential surface constitutes a raceway surface for the needles, the cage and rollers, wherein:
a slit is formed in the cage which divides the cage in the circumferential direction so that the cage can be contracted in diameter;
the cage comprises engaging projecting portions that are formed on outer circumferential surfaces of the rim portions so as to project radially outwards therefrom to be brought into engagement with the outer ring corresponding member, to thereby position the cage properly in relation to the axial direction relative to the outer ring corresponding member; and a radially outer surface of the engaging projecting portion is formed so that an edge portion facing the slit is positioned further radially outwards than an edge portion on a side lying opposite to the side facing the slit as seen in the circumferential direction.

* * * * *